H. P. SAUNDERSON.
PLOW.
APPLICATION FILED SEPT. 4, 1918.
1,335,078.
Patented Mar. 30, 1920.
2 SHEETS—SHEET 1.
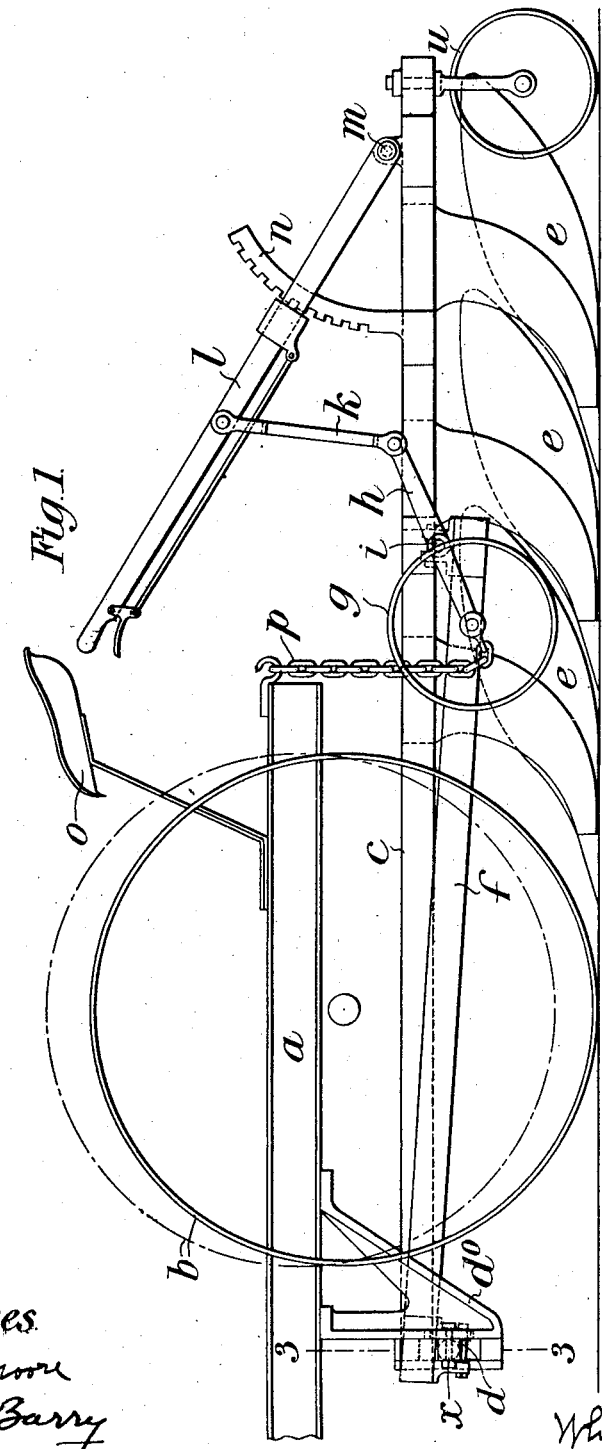
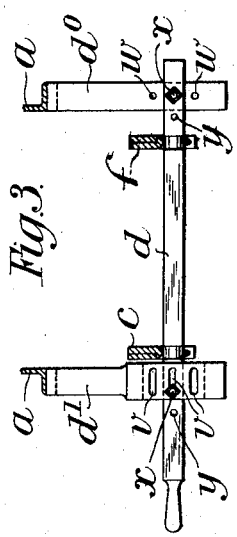
Witnesses
J. K. Moore
R. E. Barry
Inventor
Herbert P. Saunderson
By
Whitaker & Prevost
Attys

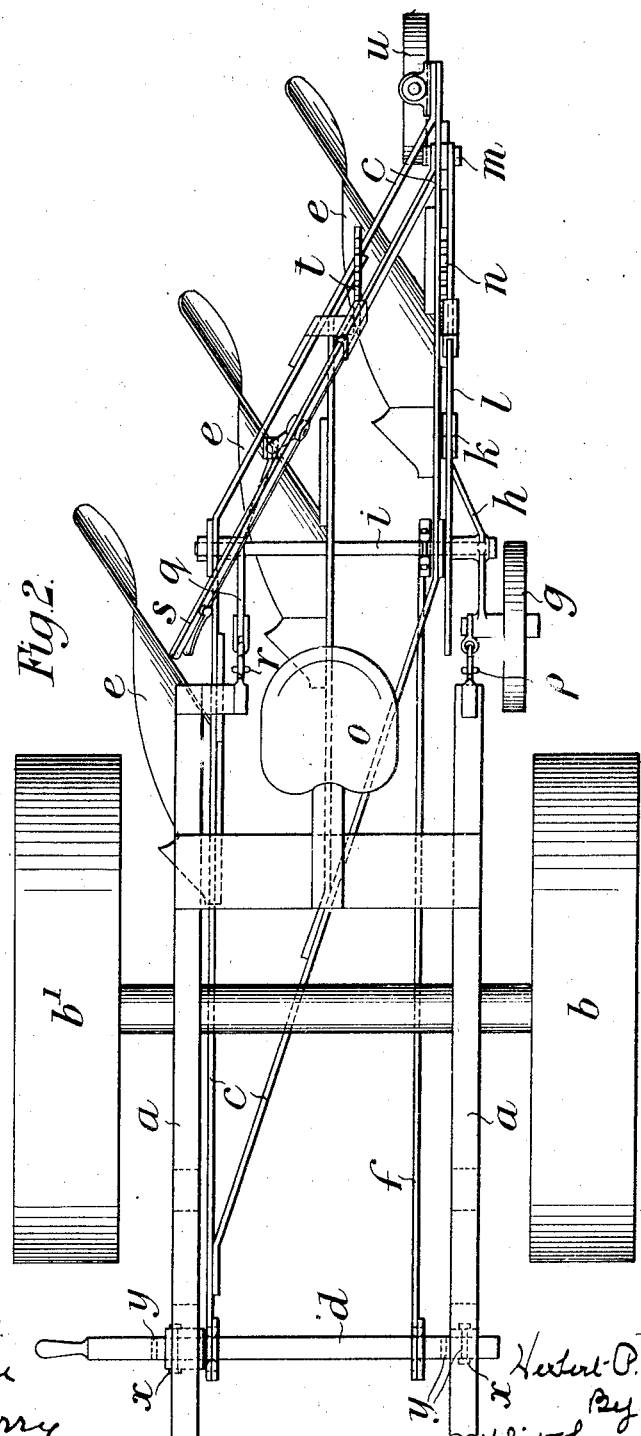

UNITED STATES PATENT OFFICE.

HERBERT PERCY SAUNDERSON, OF BEDFORD, ENGLAND.

PLOW.

1,335,078.  Specification of Letters Patent.  Patented Mar. 30, 1920.

Application filed September 4, 1918. Serial No. 252,548.

*To all whom it may concern:*

Be it known that I, HERBERT PERCY SAUNDERSON, a subject of the King of Great Britain, residing at Elstow Works, Bedford, England, have invented new and useful Improvements in or Connected with Plows, of which the following is a specification.

My invention relates to plows designed for use in connection with agricultural tractors or the like.

Heretofore it has been customary to haul independent plows coupled behind a tractor and it has been proposed to construct a plow for use in conjunction with an agricultural tractor with a frame that can be extended beneath the chassis of the tractor and connected to the latter at the two sides. This arrangement, however, possesses the disadvantage that the plow frame has to follow the oscillatory movement which may be imparted to the chassis when the tractor is running over uneven ground, and thereby causes the plow to work unevenly and throws a considerable torsional strain upon the plow frame.

The chief object of my invention is to construct the plow frame, and provide for connecting it to the tractor, in such a manner that the oscillatory movements of the latter will not impart corresponding movements to the plow, so that the latter will be free to follow the contour of the ground at the desired depth.

My invention also comprises improved means for enabling the driver sitting upon the tractor to lower or lift the plow without moving from his seat, the plow when lifted being carried clear of the ground by the tractor.

In carrying out my invention, I construct the plow frame preferably of diamond shape and I connect one side of this frame, adjacent to the forward acute angle, by a universal hinge or other joint directly to a cross draft bar capable of vertical and lateral adjustment. The other side of the frame is attached to the cross draft bar by a link connection between the said cross draft bar and a point on the plow frame some distance back from the front.

The plow body or bodies is or are arranged in such relation to the chassis that, say, the right hand rear traveling wheel of the tractor will serve as the front or furrow wheel of the plow.

A land or depth regulating wheel is carried by a crank or lever arm at one end of a shaft in bearings on the plow frame, and a hand-lever, which extends forwardly to a point adjacent to the driver's seat is provided for operating the said lever arm. For lifting the plow clear of the ground for traveling, the said crank or lever arm has connected to it a chain also attached to the chassis, and another lever arm and chain being arranged on the opposite side of the plow and operated by an independent hand-lever.

To enable my invention to be fully understood I will describe the same by reference to the accompanying drawings, in which:—

Figure 1 is a side elevation of a plow, and so much of a tractor as is necessary to illustrate my invention; and Fig. 2 is a plan of the same.

Fig. 3 is a section on the line 3—3, Fig. 1.

$a$ indicates the chassis of the tractor and $b$, $b^1$ the driving or traveling wheels of the latter. $c$ indicates the diamond-shaped frame of the plow and $d$ the cross-draft bar to which the said frame is directly connected at its forward end or front acute angle, so that the side of the frame containing this acute angle is parallel with the chassis, the said cross draft bar being carried in brackets $d^0$, $d^1$ fixed to the chassis at a point well forward and below the level of the axle of the traveling wheels. The point from which the pull is imparted to the plow frame is thus well in advance of the plow bodies $e$, $e$ fixed to the rear part of the frame $c$.

$f$ indicates the link for connecting the plow frame $c$, on the other side, to the cross-bar $d$, this link being jointed to the said frame at a point some distance from the front of the latter, say, for instance, a point adjacent to the transverse diagonal of the said frame. The joints between the frame $c$ and the cross-bar $d$, on one side, and between the link $f$ and the cross-bar, on the other side, are rounded or otherwise so formed that movement can take place between them so that the oscillations of the tractor will not be transmitted to the plow frame, thus rendering it possible, when the implement is in work, with one wheel of the tractor running in the furrow and the chassis correspondingly inclined, for the plow frame to retain its proper position with relation to the ground. The dotted circle, Fig. 1, shows the position of the traveling wheel $b$ with relation to the plow bodies when in work.

$g$ indicates the depth regulating wheel which is placed on the side of the plow frame $c$ opposite to that which is directly connected to the cross-bar $d$ and which runs on the unplowed land and serves to prevent this side of the plow from drawing too deeply into the soil. This wheel is mounted on an axle at one end of a lever arm $h$ loosely carried at one end of the shaft $i$ which extends across the plow frame $c$ adjacent to the obtuse angles of the latter, the other end of the said lever arm being connected by a link $k$ to a hand-lever $l$ pivoted upon the plow frame at $m$ and working in conjunction with a notched sector $n$. The lever $l$ extends into proximity to a seat $o$ provided for the attendant on the chassis, so that he can operate the same without leaving the seat.

To the front end of the lever arm $h$ is attached one end of a chain $p$, which chain is suspended from a hook at the rear of the chassis $a$. At the opposite end of the shaft $i$, upon which is the lever arm $h$ another lever-arm $q$ is loosely mounted connected by a chain $r$ to the chassis and this lever arm $q$ is operated by a hand-lever $s$, similar to the lever $l$, working over a quadrant $t$ and preferably upon the same pivot as the lever $l$. In practice the chain $p$ is made of sufficient length to allow of any movement of the wheel $g$ which may be requisite for regulating the depth, but so that when the lever arm $h$ has been moved to a certain extent by lifting the lever $l$ the chain $p$ will become taut and thus form a point of support which, when the lever $l$ is further lifted, will cause the lifting of one side of the frame of the plow to hold the plow bodies above the ground. The operation of the lever $s$ lifts the other side of the plow. It will be obvious that when the chains are taut, their lower ends form fulcrums for the levers $h$ and $q$ so that the continued movement of the levers $l$ and $s$ in an upward direction will cause the said levers $h$ and $q$ to move around their points of support on the said chains and lift the frame $c$ in an upward direction by acting upon the cross shaft $i$. The driver can, if desired, grasp both levers simultaneously and so lift both sides of the plow at the same time. In some cases springs can be arranged between the levers $l$ and $s$ and the frame $c$ which springs under the weight of the implement, will be compressed when the plow is lowered and will react when the levers are lifted and thus assist in the lifting operation.

$u$ indicates a trailing wheel which, if required, is arranged at the rear end of the plow frame and adapted to run in the furrow in the usual manner.

In order to provide for adjusting the position of the plow frame at the front end to suit the depth at which the plow is to work, and also to provide, in the case of a multiple furrow plow, for adjusting the position of the frame with relation to the wheels according to the width of furrow being plowed, I as hereinbefore stated, make the cross bar $d$ adjustable both vertically and laterally.

As shown in the drawings, the bracket $d^1$ is provided with a series of slots $v$, $v$ (see Fig. 3) one above the other and the other bracket $d^0$ is provided with a series of holes $w$, $w$ at corresponding distances apart so that bolt $x$, $x$ passing through the bar $d$ and through the corresponding slots and holes will serve to adjust the vertical position of the bar. To allow of adjusting the lateral position the bar itself is provided at each end with a series of holes $v$, $v$ so that by adjusting the bolts $x$ in one or other of these holes, $v$, $v$ the desired adjustment can be effected. The bar $d$ can also be adjusted vertically at that side only which is adjacent to the bracket $d^1$, the other end of the said bar turning on its bolt $x$ as a center.

The distances between the plow bodies can be adjusted in a well known manner, for instance, in the case of a three-furrow plow, by fixing, say the bodies, either on the inside of the frame or on the outside of the frame, so as to diminish or increase their distance from the center body.

It is to be understood that my invention is not limited to the use of the special lever and link arrangement herein described, for lifting the plow, as other means suitable for the purpose may be provided; for instance, I may arrange a friction drum in connection with some rotating part of the tractor around which a band is passed in such a manner that when the band is tightened upon the drum, for instance, by means of a lever or chain, the band will be caused to travel and pull on the chain to effect the desired lifting operation.

Although in describing my invention I have referred to the use of a diamond-shaped frame, it is to be understood that the use of such a frame, although probably most convenient is not essential, as the arrangement can equally be applied in the case of a rectangular frame. In such case, however, such rectangular frame would only be connected to the cross-bar $d$ on one side, a link being provided between the cross-bar and some point at the other side of the frame which would give the freedom of movement before referred to.

It is also to be understood that although my invention has been described specially as applied to plows it can be equally used in connection with a cultivator or like tilling implement.

Owing to the plow, when out of action, being carried by the tractor it forms no impediment to the movement of the latter as is the case with independent or trailing plows. The tractor and plow can, therefore, be freely turned about and manipulated at the ends of the furrows by one operator, and corners, angles or other parts or irregular fields can be better and more easily plowed, for instance, by backing the tractor and then lowering the plow to the ground.

Claims:

1. A ground treating implement, having a frame designed for attachment to a tractor and comprising the following elements, viz: a rigid bar on one side and means for jointing this bar at its front end to a tractor, a movable bar on the other side, a joint connection between the rear end of the the said movable bar and the frame, and means for jointing the front end of the said movable bar to the tractor, the said movable bar with its joints constituting a flexible member which allows of oscillation of the plow frame relative to the tractor and oscillation of the tractor independent of the plow frame.

2. In a ground treating implement, a diamond shaped frame, means for jointing the said frame at one of the acute angles on one side to a tractor, a link for connecting the frame, adjacent to one of the obtuse angles, to the tractor, and joints at the extremities of the said link for rendering the said link flexible.

3. In a ground treating implement of the kind defined in claim 1, the combination of levers and chains designed to be connected to the tractor, for lifting the implement clear of the ground, substantially as described.

4. The combination with a tractor carrying a transverse bar which is located below the axis of the rear wheels of the tractor, of a plow frame having a rigid bar on one side, extending parallel to the side bars of the tractor frame and having its front end pivotally connected to said transverse bar, and a movable bar having its front end pivotally connected to the transverse bar and its rear end pivotally connected to the plow frame.

5. A combination as defined in claim 4, in which the transverse bar is vertically and laterally adjustable.

HERBERT PERCY SAUNDERSON.